United States Patent [19]
Thomsen et al.

[11] Patent Number: 5,860,691
[45] Date of Patent: Jan. 19, 1999

[54] APPARATUS FOR COVERING A VEHICLE CARGO AREA

[75] Inventors: Larry J. Thomsen, Maple Lake; Michael J. Sterling, Coon Rapids, both of Minn.

[73] Assignee: Lund Industries, Incorporated, Anoka, Minn.

[21] Appl. No.: 822,304

[22] Filed: Mar. 21, 1997

Related U.S. Application Data

[60] Provisional application No. 60/013,965 Mar. 22, 1996.

[51] Int. Cl.$^6$ .................................................. B60P 7/04
[52] U.S. Cl. ..................................................... 296/100.18
[58] Field of Search ........................ 296/100.16, 100.17, 296/100.18

[56] References Cited

U.S. PATENT DOCUMENTS

| | | | |
|---|---|---|---|
| D. 281,487 | 11/1985 | Chapman | D12/156 |
| D. 323,479 | 1/1992 | Akashi et al. | D12/156 |
| D. 324,195 | 2/1992 | Ueno | D12/156 |
| D. 333,607 | 3/1993 | Isler | D8/382 |
| D. 337,554 | 7/1993 | Lucas | D12/156 |
| D. 350,107 | 8/1994 | Ramaciotti | D12/401 |
| 3,936,077 | 2/1976 | Bliek | 280/423 R |
| 3,954,296 | 5/1976 | Patnode | 296/10 |
| 4,061,394 | 12/1977 | Vodin | 296/100 |
| 4,273,377 | 6/1981 | Alexander | 296/100 |
| 4,285,539 | 8/1981 | Cole | 296/105 |
| 4,377,307 | 3/1983 | Santarelli | 296/136 |
| 4,479,677 | 10/1984 | Gulette et al. | 296/98 |
| 4,573,730 | 3/1986 | Gondert et al. | 296/1 S |
| 4,600,233 | 7/1986 | Byodston | 296/24 R |
| 4,687,247 | 8/1987 | Muscat | 296/136 |
| 4,730,866 | 3/1988 | Nett | 296/100 |
| 4,792,178 | 12/1988 | Kokx | 296/98 |
| 4,799,729 | 1/1989 | Muscat | 296/136 |
| 4,838,602 | 6/1989 | Nett | 296/100 |
| 4,861,092 | 8/1989 | Bogard | 296/100 |
| 5,067,768 | 11/1991 | Fishbach | 296/107 |
| 5,139,375 | 8/1992 | Franchuk | 410/105 |
| 5,152,574 | 10/1992 | Tucker | 296/100 |
| 5,183,309 | 2/1993 | Jordan | 296/100 |
| 5,207,262 | 5/1993 | Rushford | 160/354 |
| 5,228,736 | 7/1993 | Dutton | 296/39.2 |
| 5,261,719 | 11/1993 | Tucker | 296/100 |
| 5,275,458 | 1/1994 | Barben et al. | 296/100 |
| 5,301,995 | 4/1994 | Isler | 296/100 |
| 5,328,310 | 7/1994 | Lockney | 410/97 |
| 5,335,960 | 8/1994 | Benignu, Jr. | 296/165 |
| 5,385,377 | 1/1995 | Girard | 296/36 |
| 5,398,985 | 3/1995 | Robinson | 296/10 |
| 5,472,256 | 12/1995 | Tucker | 296/100 |

OTHER PUBLICATIONS

Custom Form Mfg., Inc., "Here it is!, Custom Cover™, the Ultimate Tonneau Cover", brochure from Custome Form Mfg., Inc., 2100 Industrial Pkwy, Elkhart, IN 45616 *undated).
"Saber Tonno" brochure from Extang Corportion, Ann Arbor, MI (undated).
"Tonneau Clearing House" brochure from California Concepts, Carson, CA (undated).
"Sport Truck Stylin' Concepts" brochure (undated).
SNUGTop® brochure, General Motors Company (updated).
"Performance Covers" brochure (undated).

*Primary Examiner*—Gary C. Hoge
*Attorney, Agent, or Firm*—Merchant, Gould, Smith, Edell, Welter & Schmidt, P.A.

[57] ABSTRACT

An apparatus for covering an area between opposed walls is provided by the present invention. The apparatus includes rails for mounting on the opposed walls, and a covering material for covering the area between the opposed walls. The rails include ridges and channels which allow for adjustment of the tautness of the covering material between the opposed walls. The covering material includes a fabric for suspension between the opposed walls and has edges which include ridges and channels. The ridges and channels in the rails and the ridges and channels in the covering material are constructed and arranged to mate in order to provide a releasable connection.

6 Claims, 5 Drawing Sheets

5,860,691

APPARATUS FOR COVERING A VEHICLE CARGO AREA

This application claims priority to U.S. Provision Patent Application Ser. No. 60/013,965, which was filed on Mar. 22, 1996.

I. FIELD OF THE INVENTION

The present invention relates to an apparatus for covering a vehicle cargo area, and more particularly to a lockable apparatus for covering a vehicle cargo area while providing for convenient adjustment of tautness.

II. BACKGROUND OF THE INVENTION

Tonneau covers mounted on pickup truck beds are common. Tonneau covers are generally used to help contain and/or conceal goods in the truck bed, and to protect the goods from weather. Various designs of tonneau covers are available. For example, U.S. Pat. No. Re. 33,790 to Huber and U.S. Pat. No. 3,829,151 to Fellenstein describe tonneau covers having hard and rigid covers over the pickup truck beds. Such covers can be heavy and difficult to manipulate.

Many designs exist for flexible tonneau covers. For example, see U.S. Pat. Nos. 4,730,866 and 4,838,602 listing James Nett as an inventor; and U.S. Pat. Nos. 5,251,960; 5,121,960; 5,365,994; 4,693,033; 5,310,238; and 5,058,652 listing Donald Wheatley as an inventor. The tonneau covers described by these patents can be referred to as soft tonneau covers. Several of the presently available designs incorporate snap-type connections. It has been observed that snap connections can sometimes be difficult to operate, and can cause stress lines in the tonneau cover fabric. Furthermore, it has been observed that the tonneau cover fabric becomes soft in warm weather which causes it to sag. In cold weather, the fabric loses its flexibility and becomes stiff, and thus, becomes hard to install and may be prone to tear.

III. SUMMARY OF THE INVENTION

An apparatus for covering an area between opposed walls is provided by the present invention. The apparatus includes rails for mounting on the opposed walls, and a covering material for covering the area between the opposed walls. The rails include ridges and channels which allow for adjustment of the tautness of the covering material between the opposed walls. The covering material includes a fabric for suspension between the opposed walls and has edges which include ridges and channels. The ridges and channels in the rails and the ridges and channels in the covering material are constructed and arranged to mate in order to provide a releasable connection.

A truck is provided by the present invention. The truck includes a cargo area surrounded by a driver sidewall, a passenger sidewall, a tailgate, and a front wall. Elongated rails are mounted on the driver sidewall and the passenger sidewall. The elongated rails include a mounting surface constructed and arranged to mount on the sidewalls, and ridges and channels for mounting the cover. A cover is mounted on the rails, and the cover has edges including ridges and channels for mating with the ridges and channels on the elongated rails. In a preferred embodiment, the cover is sufficiently low over the cargo area that a cab spoiler can be provided. In addition, the cover can be locked in place on the truck.

IV. BRIEF DESCRIPTION OF THE DRAWINGS

V. DETAILED DESCRIPTION OF THE INVENTION

Figure 1:
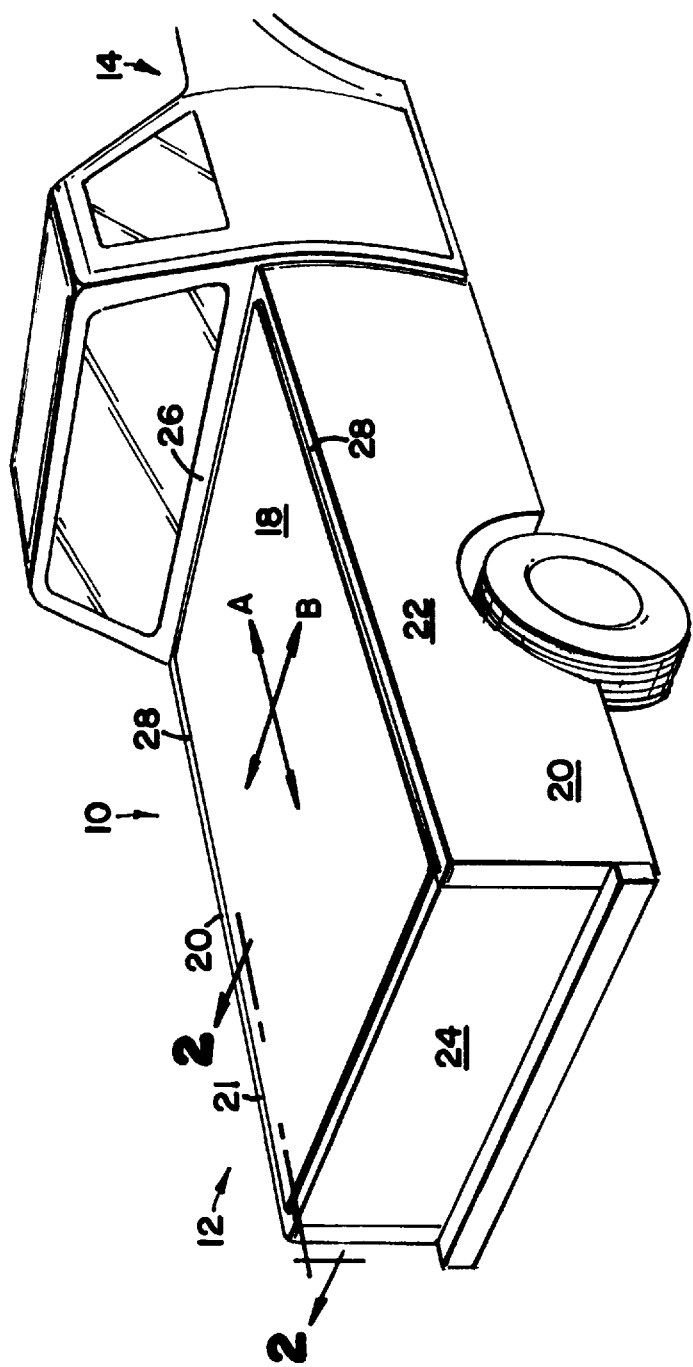
FIG. 1 is a perspective view of an embodiment of the apparatus according to the present invention on a pickup truck.

The preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Referring to FIGS. 1–4, the reference numeral 10 generally designates an apparatus for covering or shielding the interior area of a cargo bed or box 12 of a pickup truck 14. The apparatus 10 will be referred to as a tonneau cover or a covering apparatus, and the interior area of the box 12 will be referred to as the cargo area. While the preferred embodiment of the invention is described in relation to the cargo area of a pickup truck, it should be appreciated that the invention can be adapted to cover other areas, such as, those provided in boats, trucks, and the like. In general, it will be apparent from the following description that the covering apparatus of the present invention can be adapted to cover areas which are bordered by opposing walls.

The box 12 of the pickup truck 14 is similar to the boxes provided by many commercially available pickup tucks. In particular, the box 12 includes sidewalls 20, tailgate 24, and cab wall 26. The sidewalls 20 include a driver sidewall 21, and a passenger sidewall 22. As commonly found in many commercially available pickup trucks, the sidewalls 20 are provided with top surfaces 28 and downwardly, depending walls 30.

The tonneau cover 10 includes two general assemblies or arrangements. The first assembly is referred to as the frame or supporting structure 16. It will be appreciated from the following description that the frame 16 is not required to be a connected structure or foundation. Rather, according to a preferred embodiment, the frame can be provided as two separate bases upon which the second assembly rests. The second assembly is referred to as the covering material or shielding structure 18. The covering material 18 can be referred to as the cover for convenience. However, it should be appreciated that the cover 18 is a part of the tonneau cover 10. As described in detail herein, the frame 16 mounts to the box 12 and provides sufficient structural support for holding the cover 18 in place in spite of the forces normally encountered on the back end of a pickup truck. The cover 18 suspends from or rests on the frame 16. In a preferred embodiment, only the frame 16 is directly attached to the pickup truck. The ease of installing the frame 16 and of manipulating the cover 18 are a few of the advantages provided by the present invention which will be apparent from the following description.

The frame 16 includes side rails 34 for mounting to the sidewalls 20, a mounting system 36 for mounting or holding the side rails 34 in place, latches 38 for securing the ends of the cover 18 in place and for providing a means for locking;

and optional supporting structure 40 for assisting in supporting or holding up the cover 18, particularly in the center region thereof. It should be appreciated that various designs can be provided for each of the above features while keeping within the scope of the present invention.

The side rails 34 are shown as L-shaped rails provided with a cover engaging arm 42 and an accessory engaging arm 44. The angle between the two arms is provided to allow the cover engaging arm 40 to rest on the top surface 28 and extend around so that the accessory engaging arm 42 lie against the depending wall 30. The side rails 34 generally extend along the length of the sidewalls 20 and are mounted thereto. The side rails 34 approximately define the length of the tonneau cover. It should be appreciated that although the side rail 34 on the driver sidewall 21 is shown, an identical side rail is provided on the passenger sidewall 22. The two side rails are provided as mirror images of each other.

The side rails 34 are preferably manufactured from extruded aluminum in order to provide sufficient structural support and rigidity. Of course the side rails could be manufactured from other materials such as plastic.

The side rails 34 are provided with an accessory channel 50 on the accessory engaging arm 44, and ridges and channels 52 on the cover engaging arm 42. The accessory channel 50 includes channel flanges 54 which define an accessory area 56 therebetween. It is in the accessory area 56 where various accessories can be provided as described below. The ridges and channels 52 include a plurality of rigid, angled teeth 60 for engaging the sides of the cover 18 in order to hold it in place on the side rails 34. The teeth 60 are provided so that they angle away from the cargo area to provide a tension inducing effect. The teeth 60 include gripping ends 62 are provided to hook the cover 18 in place. The relationship between the ridges and channels 52 and the cover 18 is explained in more detail below. It should be appreciated, however, that the design for attaching the cover 18 to the side rails 34 allows one to adjust the tension or tautness in the tonneau cover 10 to reflect daily changes in temperature which may cause the cover 18 to expand or contract.

The mounting system 36 for mounting or holding the side rails 34 to the sidewalls 20 preferably includes a plurality of C clamps 70 positioned along the length of the side rails 34. In order to sufficiently hold the side rails 34 in place, at least two clamps should be used on each side, and should be positioned near the ends of the sidewalls 20. Preferably, at least 3, 4, or more clamps 70 are provided along each sidewall 20. Alternatively, the side rails can be attached by other fasteners, such as, bolts, screws, rivets, welding, adhesive, and the like.

The clamp 70 should be sufficiently designed so that one jaw element 71 presses against the accessory area 56 while another jaw element 72 presses against the depending wall 30. As shown, the clamp 70 has a pair of opposing arms 74 and 75 which are movably secured at joint 76. The clamp 70 is clamped via the bolt assembly 77. As one skilled in the art would appreciate, the clamp provides a very simple and quick means for attaching the frame 16 to the pickup truck 14.

A preferred feature of the invention is that it provides a covering apparatus which is easy to install and which can be easily removed without leaving holes which may detract from appearance and provide a surface of exposed metal where rusting can begin. This means that it can be quickly and conveniently attached to the bed of a pickup truck by a consumer, and later removed. Since the covering apparatus is so easy to install, there is no need to have a dealer install it when the clamps 70 are used to attach the side rails 34 since no holes need to be drilled in the pickup truck box 12. In addition, it should be appreciated that drilling several holes in pickup truck sidewalls tend to detract from the ultimate resale value of the vehicle.

The latches 38 and the supporting structure 40 can be installed along the accessory channel 50. It is expected that one would find it easier to first install the supporting structure 40, followed by installation of the latches 38. The supporting structure 40 generally includes a bracket assembly 80 which includes a flange 82 which slides into the accessory channel 50. Screws 84 are provided to tighten the bracket assembly 80 in place along the side rails 34. Preferably, three bracket assemblies are installed on each side rail, and they are preferably spaced at equal intervals between the ends of the side rails. Bows 86 can be provided to extend between opposed bracket assemblies 80. The supporting structure 40 can then be used to help support the cover 18 to reduce sagging. As would be apparent to one skilled in the art, the bows 86 can be provided with a desired bend or flatness to effect a desired final appearance of the tonneau cover 10. It is expected that most consumers would prefer a flat and even profile across the tonneau cover 10 as shown in FIG. 1.

The latches 38 are preferably installed near each end of the side rails 34. The installation of the latches 38 first involves sliding flat-headed bolts or weld studs 90 into the accessory channels 50. The latches 38 are then placed over the threaded ends of the flat-headed bolts 90 so that the threaded end fit through holes 91. Nuts 92 are then applied over the threaded ends of the flat-headed bolts 90 and used to tighten the latches 38 in place. It should be appreciated that the latches 38, when used at both ends of the side rails 34, should be arranged in essentially opposite directions as will be explained below. In a preferred embodiment of the invention, latches 38 are positioned at each end of the side rails 34.

Again referring to FIGS. 2 and 4, the cover 18 of the present invention is shown in detail. The cover 18 includes a fabric 100 which stretches between the side rails 20 for covering the cargo area, flexible side members 102 provided on each side of the fabric 100 for engaging the ridges and channels 52 on the side rails 34, and rigid end rails 104 provided at each end of the fabric 100 for engaging the latches 38. In a preferred embodiment, all of the parts of the cover are attached as one piece which may be referred to as the covering material or the covering member or simply as the cover.

The fabric 100 is preferably a water resistant material which means that it has a tendency to shed water rather than absorb it. In addition, the material should be sufficiently flexible so that it can be folded and stretched, and should be sufficiently durable to withstand changes in temperatures normally associated with the varying seasons without cracking or melting, and resistant to damage caused by the sun. A preferred material is a polyester sheeting coated with vinyl. Additional commercially available materials which are suitable for use in the present invention would be well known to those skilled in the art.

The flexible side members 102 are attached along the sides of the fabric 100. As shown, the flexible side members 102 are sewn to the fabric 100 at stitch lines 106. The flexible side members 102 are preferably made of a plastic material which provides desired flexibility so that the flexible ridges and channels 108 can mate or engage the ridges and channels 52 on the side rails 34. A preferred plastic which can be used to form the flexible side members 102 is polyurethane, such as, Texin 480A Natural which is available from Mobay Corporation.

Figure 4:
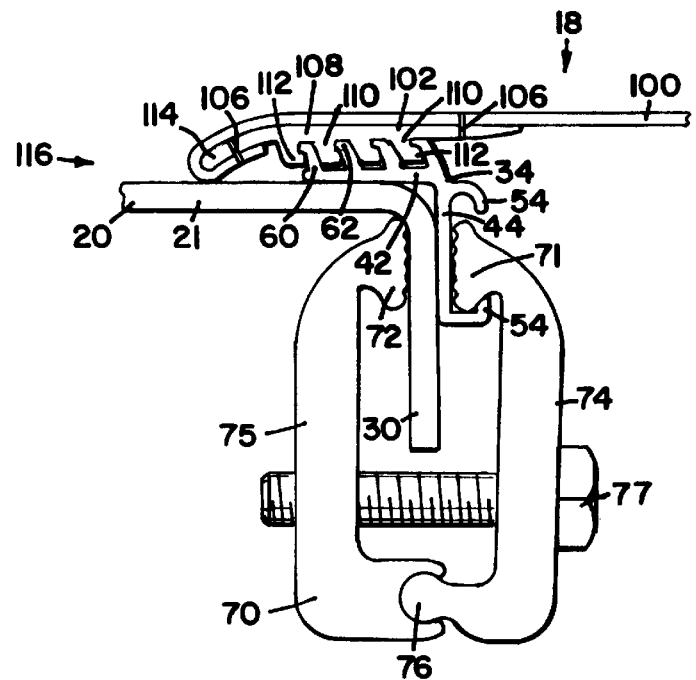
FIG. 4 is a cross sectional view taken along line 4—4 in FIG. 2.

As shown in FIG. 4, the flexible ridges and channels 108 mate or engage the ridges and channels 52. Similar to the structure of the ridges and channels 52, the flexible ridges and channels 108 include a plurality of angled teeth 110 for engaging the teeth 60 of the side rails 34. The teeth 110, however, are provided so that they angle toward the cargo area which allows them to fit between the teeth 60 which angle away from the cargo area. The teeth 110 are equipped with gripping ends 112 which facilitate gripping with the teeth 60, and in particular with the gripping ends 62. It should be appreciated that the gripping ends 110 and 62 act as hooks to hold the flexible side members 102 to the side rails 34.

The flexible side members 102 are provided with tabs 114 which facilitate manipulation of the cover 18. The tabs 114 allow one to grip the cover 18 and pull it to provide increase tension. Thus, one can increase tension or decrease tension in the cover 18 by adjusting the way the teeth 60 and 110 interact. For example, causing the teeth to engage so that at least one of the teeth 110 closest to the tab 114 does not engage the teeth 60 provides an increase in tension. Causing the teeth to engage so that at least one of the teeth 110 furthest from the tab 114 does not engage the teeth 60 results in a loosening or a decrease in tension. It should be appreciated that only one tooth from both teeth 110 and 60 need to engage each other to provide sufficient closure, and preferably at least two teeth should be engaged.

It should be appreciated that the above-described design for attaching the cover 18 to the side rails 34 allows one to adjust the tension and/or tautness in the tonneau cover 10 to reflect daily changes in temperature which may cause the cover 18 to expand or contract. Furthermore, the tabs 114 help hide the side connection structure 116 and enhances the aesthetics of the tonneau cover by providing a smooth transition between the top surface 28 and the cover 18, which provides a more satisfying low profile for the tonneau cover 10.

In an alternative embodiment of the invention, several more teeth can be provided as desired to provide for increased or decreased tension. One may choose not to use end connections if the cover can be held in place by virtue of the side connection structure. Such a tonneau cover, however, would not have a locking feature. If desired, the tonneau cover could be designed so that the ends would include the same or similar type of connection.

Figure 2:
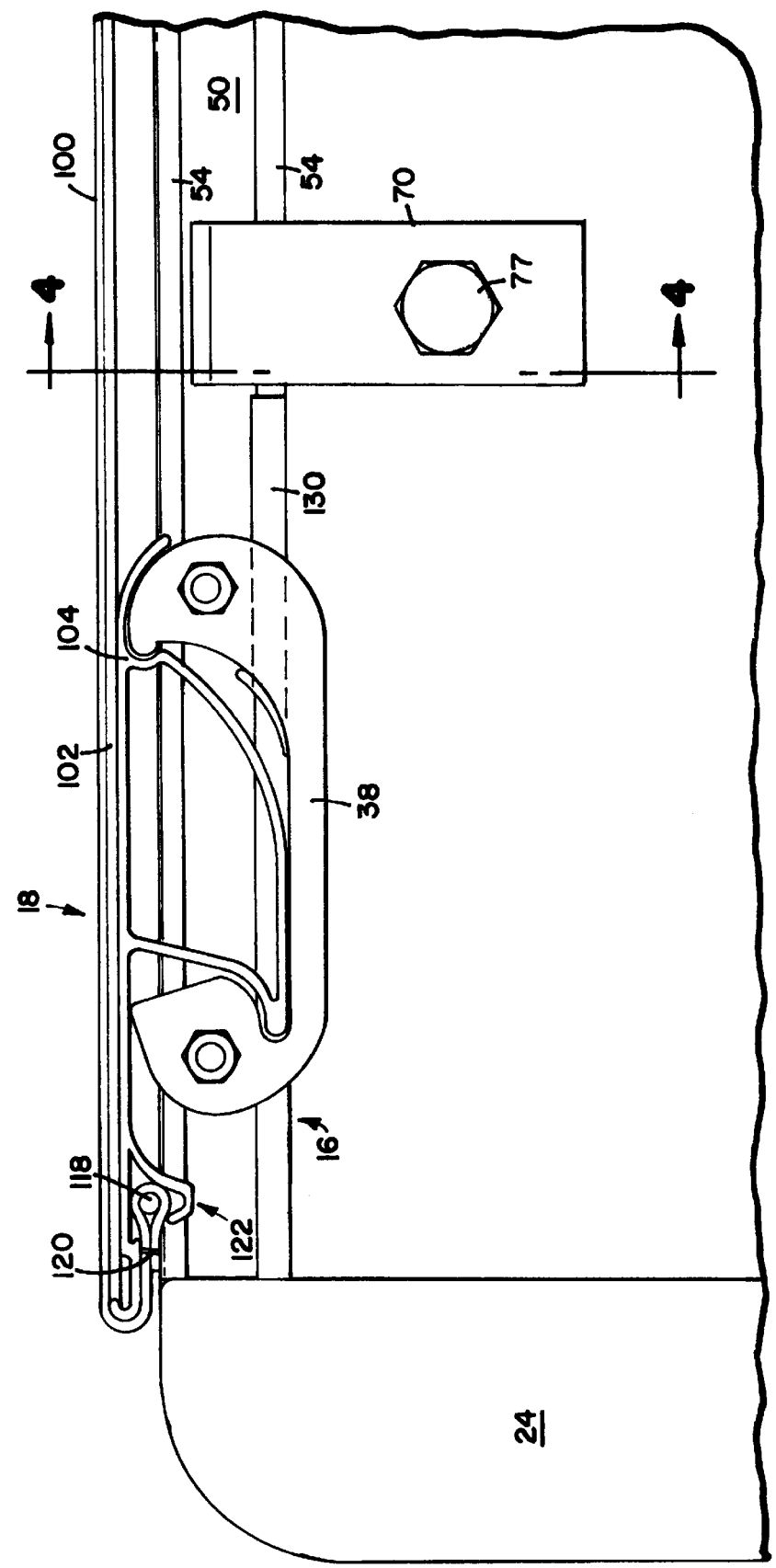
FIG. 2 is a cross sectional view taken along line 2—2 in FIG. 1.
Figure 3:
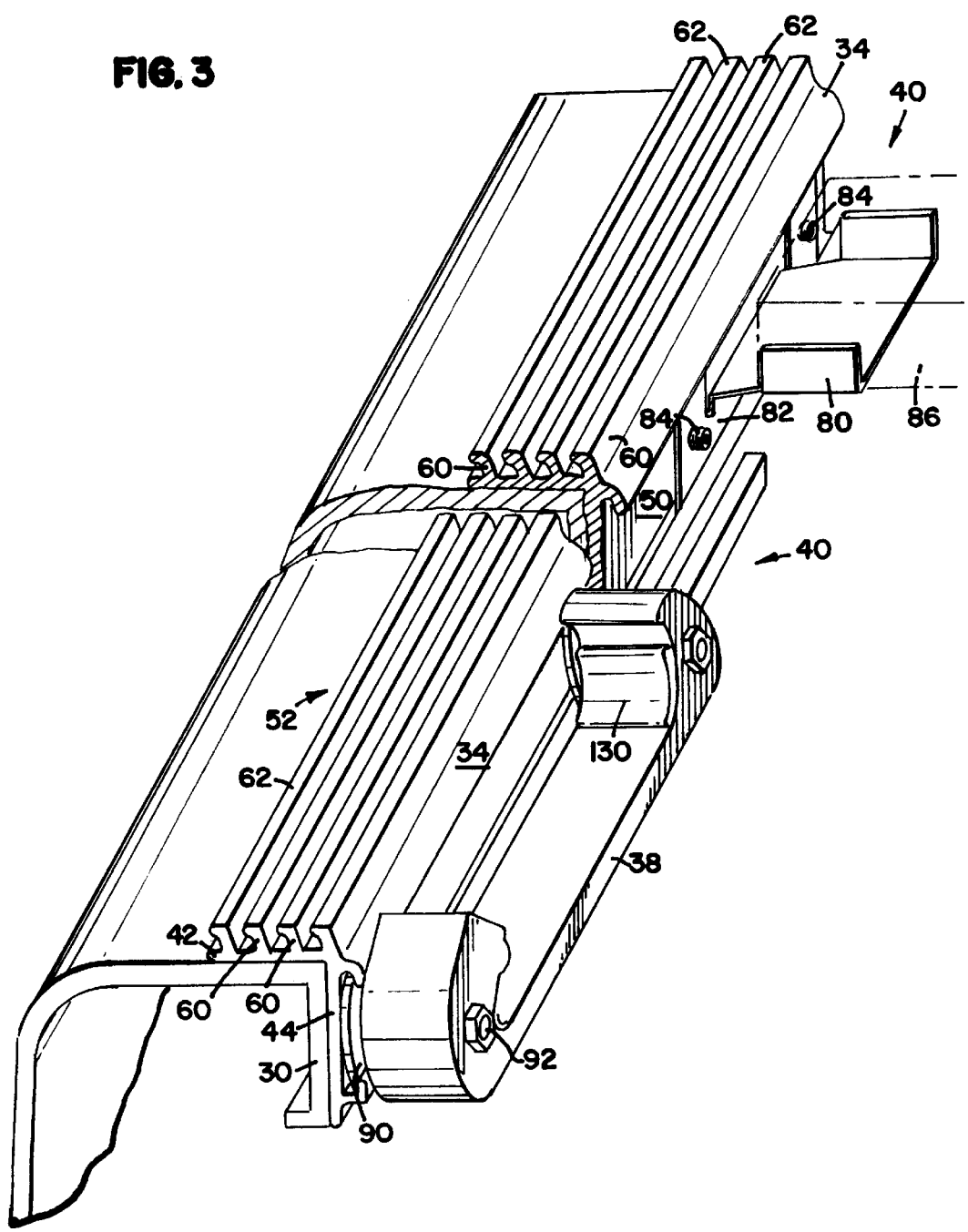
FIG. 3 is a perspective view of parts of the apparatus of FIG. 1, shown along the driver sidewall.

The rigid end rails 104 are provided for holding the end of the cover 18 down and providing proper tension along the length thereof. As shown in FIG. 2, the rigid end rails 104 are attached to the fabric 100 by sewing in a rod 118. Thus, the fabric 100 wraps around the rod 118, and is held in place by the stitch 120, and is seated in the rod seat 122.

As shown in FIG. 2, the tonneau cover 10 is provided in a locked position. This means that the cover 18 rests on the frame 16 along the full length of the box 12, the rigid end rails 104 are seated into the latches 38, the side connection structures 116 are engaged, and the tailgate 24 being closed and locked. In a preferred embodiment of the invention, only the cover 18 is visible when the covering apparatus 10 is in the closed and locked position. A preferred way to unlock the tonneau cover 10 is to open the tailgate 24 and pop the rigid end rail 104, proximate the tailgate, out of the latches 38. It should be appreciated that the rigid end rails 104 are made from extruded aluminum in order to provide sufficient rigidity.

Figure 5:
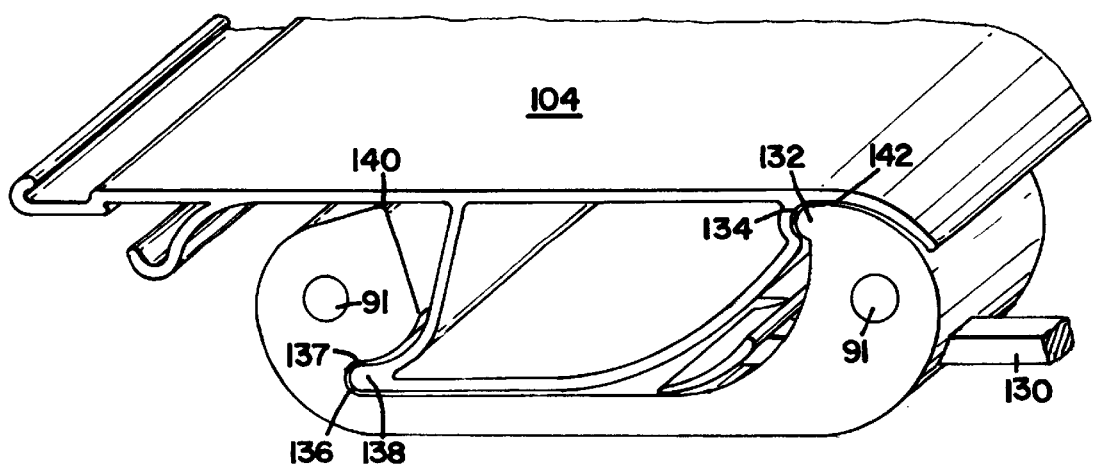
FIG. 5 is a view showing the apparatus of FIG. 1 in a locked position.
Figure 6:
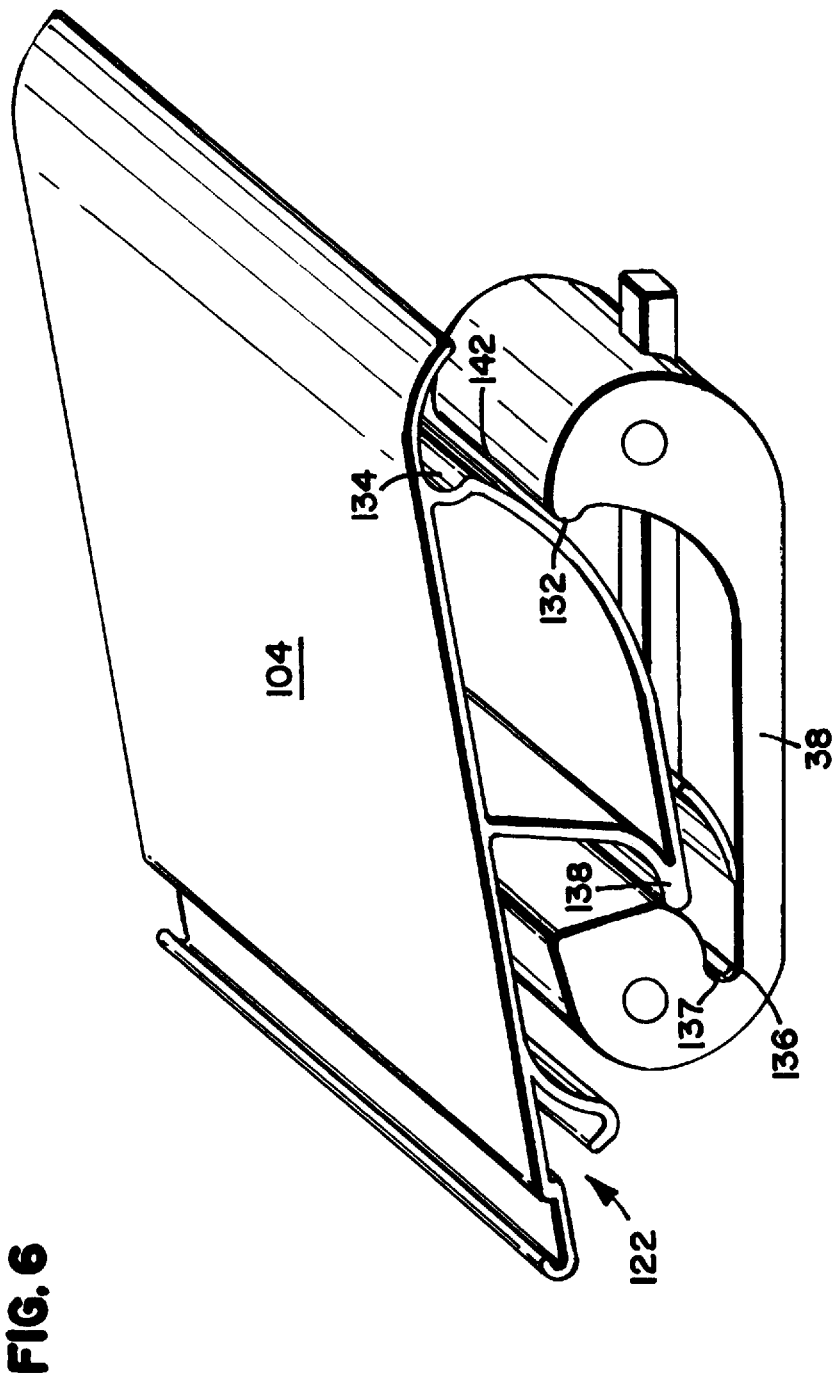
FIG. 6 is a view showing the apparatus according to the present invention in an unlocked position

Now referring to FIGS. 5 and 6, it is demonstrated how the rigid end rails 104 become seated and unseated in the latches 38. As shown in FIG. 5, the rigid end rail 104 is seated in the latch 38. This means that it remains in place until a force is directed on the plunger 130 along the direction of the arrow. Alternatively, a force can be directed by hand directed against the bottom exposed side of the rigid end rail 104 which is exposed between the latches 38. It should be appreciated that it is not necessary to provide the latches 38 with a thickness which is greater that 2 inches, and preferably about 1.5 inches. The force dislodges or unseats the rigid end rail 104 as shown in FIG. 6.

It has been found to be helpful to include, as part of the latch 38, a bump 132 which holds the rigid end rail 104 in place when it is seated. The indent 134 on the rigid end rail is provided to engage the bump 132 as shown in FIG. 5. A receiving slot 136 is provided in the latch to allow the guiding edge 138 to be inserted therein. When the latch 38 is manufactured from a rigid material, such as a hard and durable plastic material, a foam member 137 is provided to provide a force which pushes the indent 134 into the bump 132 when the rigid end rail is seated. In FIG. 5, the foam member 137 is shown compressed.

Another important feature of the latch 38 is provided by the extended surfaces 140 and 142. These surfaces provide that the rigid end rails remains at the appropriate elevation when it becomes seated. Furthermore, the forward rigid end rail located proximate to the cab or cab wall 26 is preferably arranged in reverse compared with the rear end rail shown in FIG. 2. Accordingly, the height of the tonneau cover 10 can be low enough to allow a cap spoiler on the truck 14. In addition, the entire cover 18 can be very quickly removed from the truck with no cross bar provided over the tailgate.

One advantage of the present invention is that the tailgate 24 can be operated while leaving the cover 18 in a closed position. That is, when the rear rigid end rail is seated in the latch. It should be appreciated that if the tailgate 24 is down, the tonneau cover 10 is not locked since a person could easily "pop" it open. Thus, the tonneau cover 10 can be locked by closing and locking the tailgate 24. It should be understood that locking the tonneau cover 10 does not provide absolute protection from theft since a thief could cut through the cover 18. A greater degree of protection is provided, however, compared with many commercially available soft tonneau covers.

In a preferred embodiment of the invention, the tonneau cover 10 is essentially symmetrical about a forward extending (front to back) axis A and is symmetrical about a side to side extending axis B. This means that the mechanics on the driver side reflects the mechanics on the passenger side, and that the mechanics on the forward side reflects the mechanics on the rear side. As certain components are described in the drawings in regard to their location at certain points or areas of the covering apparatus, one skilled in the art would readily appreciate how the various corresponding or mirror images would be provided at various other parts of the tonneau cover. Certainly, the present invention does not require symmetry.

It is claimed:

1. An apparatus for covering an area provided between opposed walls, comprising:

rails for mounting on the opposed walls, said rails comprising wall to wall adjustment surfaces comprising ridges and channels; and a covering material for covering the area provided between opposed walls, said covering material comprising a fabric and edges comprising wall to wall adjustment surfaces comprising ridges and channels;

wherein the ridges and channels in said rail and the ridges and channels in said covering material are constructed and arranged to mate.

2. The apparatus for covering an area provided between opposed walls according to claim 1, wherein the ridges and channels in said rail are rigid, and the ridges and channels in said covering material flexible.

3. A lockable apparatus for covering a cargo area of a truck wherein the cargo area is surrounded by a driver sidewall, a passenger sidewall, a tailgate, and a cab wall, comprising:

a frame comprising elongated rails, a mounting system, and a latch, wherein the elongated rails comprise a mounting surface for mounting to the driver sidewall and the passenger sidewall, and a cover holding surface comprising channels and ridges, the mounting system comprises clamps for holding said frame to the driver sidewall and the passenger sidewall; and a cover having opposed edges and opposed ends, and constructed and arranged for extending between the elongated rails and along the length of the elongated rails, said cover comprising a flexible fabric and flexible members on the edges comprising ridges and channels for mating with the ridges and channels on said elongated rails, and rigid end rails along the opposed ends of the cover for securing between the elongated rails.

4. The lockable apparatus for covering a cargo area of a truck according to claim 3, wherein the ridges and channels on said elongated rails and on said cover edges are constructed and arranged to provide varying tension across the cover.

5. A truck comprising:

a cargo area surrounded by a driver sidewall, a passenger sidewall, a tailgate, and a front wall;

elongated rails mounted on the driver sidewall and the passenger sidewall, said elongated rails provided with a mounting surface constructed and arranged to mount on the sidewalls, and ridges and channels; and a cover having edges comprising ridges and channels for mating with the ridges and channels on said elongated rails.

6. The truck according to claim 5, further comprising a cab spoiler.

\* \* \* \* \*

UNITED STATES PATENT AND TRADEMARK OFFICE
CERTIFICATE OF CORRECTION

PATENT NO. : 5,860,691

DATED : JANUARY 19, 1999

INVENTOR(S) : THOMSEN ET AL.

It is certified that error appears in the above-identified patent and that said Letters Patent is hereby corrected as shown below:

Col. 6, line 10: "that" should read —than—

Col. 7, line 9: insert —are— before "flexible"

Signed and Sealed this

Sixth Day of February, 2001

Attest:

Q. TODD DICKINSON

*Attesting Officer*     *Director of Patents and Trademarks*